Patented May 7, 1935

2,000,881

UNITED STATES PATENT OFFICE 2,000,881

METHOD OF PURIFYING TETRACHLOROETHYLENE

Gerald H. Coleman, Midland, Mich., assignor to The Dow Chemical Company, Midland, Mich., a corporation of Michigan No Drawing. Application November 20, 1933, Serial No. 698,927

6 Claims. (Cl. 260—162)

This invention concerns an improved method of purifying tetrachloroethylene.

Commercial tetrachloroethylene usually is contaminated with impurities which cannot satisfactorily be removed by usual methods, e. g. fractional distillation, and which render the material unsuited to certain purposes wherein the pure compound is required. The composition of such impurities is not definitely known, but they are believed to consist largely of chlorinated aliphatic hydrocarbons other than tetrachloroethylene, organic acid chlorides, phosgene, etc. Some of the impurities are relatively unstable toxic materials which render the commercial tetrachloroethylene particularly unsatisfactory for pharmaceutical uses.

The unstable toxic impurities have been found to form with benzidine a yellow color or a flocculent precipitate, according to the amount of such impurities present. The presence of such impurities can readily be detected by treating a sample of tetrachloroethylene with an approximately equal volume of a 10 per cent solution of benzidine in benzene and permitting the resultant solution to stand in the dark for 12 hours. If at the close of this period a yellow color or a precipitate has developed, the tetrachloroethylene is contaminated with unstable toxic impurities of the type mentioned above. If no yellow color or precipitate has developed, the tetrachloroethylene is practically free of such unstable toxic impurities. This test will hereinafter be referred to as the "benzidine test".

I have now found that technical tetrachloroethylene can be purified completely by treating the same with aluminum or an aluminum halide and thereafter separating the purified product by usual procedure, e. g. fractional distillation.

The invention, then, consists in the method of purifying tetrachloroethylene hereinafter fully described and particularly pointed out in the claims, the following description and examples setting forth in detail only certain of the various ways in which the principle of the invention may be employed.

Technical tetrachloroethylene is treated with a small quantity, e. g. about 1 per cent its weight or more, of anhydrous aluminum chloride. The resultant mixture is heated to a temperature at which hydrogen chloride is liberated and the operation preferably is continued until hydrogen chloride is no longer evolved. After such treatment with aluminum chloride, the mixture can be fractionally distilled to separate substantially pure tetrachloroethylene. Prior to distilling purified tetrachloroethylene from the mixture, I prefer to destroy or remove the anhydrous aluminum chloride by usual procedure, e. g. washing with mineral acid or water, adding a base and filtering, etc. The residual organic material is washed thoroughly with water, dried, and then fractionally distilled.

Instead of separating purified tetrachloroethylene as described above I find that the separation can be carried out most satisfactorily and in fewest steps by fractionally steam distilling the mixture which results from the treatment of technical tetrachloroethylene with aluminum chloride. During such operation a relatively small fraction of low boiling material is first collected followed by the main fraction of pure tetrachloroethylene and water. The tetrachloroethylene-water fraction distills at approximately 86–87° C. at 746 millimeters pressure. The tetrachloroethylene layer of the distillate is separated and dried, e. g. over anhydrous calcium chloride, sodium sulphate, or other drying agent.

In purifying tetrachloroethylene by the above method, I have found it most economical and satisfactory to employ the aluminum chloride in amount representing about 1 per cent the weight of the tetrachloroethylene used. It will be understood, however, that the aluminum chloride may be used in larger amount, if necessary, or, when the tetrachloroethylene to be purified contains only traces of impurities, a smaller amount of aluminum chloride may successfully be used.

Instead of treating technical tetrachloroethylene with aluminum chloride, the impure tetrachloroethylene may be contacted with metallic aluminum, preferably at an elevated temperature. I have found that impurities usually present in tetrachloroethylene react with aluminum to form a mixture from which pure tetrachloroethylene can readily be separated by fractional distillation.

The following examples describe several ways in which the principle of my invention has been employed, but are not to be construed as limiting the invention.

Example 1

Commercial tetrachloroethylene, from stock which had first been tested and found to have the specific gravity 1.591 and boiling point 115°–120° C. at atmospheric pressure and to give a strongly positive benzidine test, was treated with 1 per cent its weight of aluminum chloride. The mixture was heated under reflux for 2 hours. It was then cooled, washed with water, dried, and distilled. There was obtained pure tetrachloroethylene of boiling point 120.3°–120.8° C. at atmospheric pressure and specific gravity 1.621 at 20° C. as compared with water at 4° C. The purified tetrachloroethylene gave a negative benzidine test.

Example 2

Commercial tetrachloroethylene, from stock which had been tested and found to have the specific gravity 1.584, to boil between 118.5° and 126° C. at atmospheric pressure, and to give a strongly positive benzidine test, was treated with approximately 0.7 per cent its weight of anhydrous aluminum chloride. The resultant mixture was heated under reflux for 2 hours. The mixture was then treated with 47.5 per cent its weight of an aqueous calcium hydroxide slurry containing 1.2 per cent by weight of calcium hydroxide. The aqueous mixture was fractionally steam distilled, the fraction boiling at 86–87° C. at 746 millimeters pressure being collected. The organic layer of this fraction was separated and dried over calcium chloride. It was found to be substantially pure tetrachloroethylene, boiling at 117.4°–120.4° C. at 746 millimeters pressure and having the specific gravity 1.615 at 20° C. with respect to water at 4° C. The purified tetrachloroethylene was found to give a negative benzidine test.

Example 3

A mixture of 5 grams of aluminum turnings and 350 grams of technical tetrachloroethylene, from stock which had been tested and found to boil at 117.6°–126.1° C., to have the specific gravity 1.584, and to give a strongly positive benzidine test, was heated under reflux for 3 hours. During said operation, a portion of the aluminum was dissolved and considerable hydrogen chloride was evolved. The reacted mixture was steam distilled without fractionation and the organic layer of the distillate was separated, dried, and fractionally distilled to obtain substantially pure tetrachloroethylene. The purified tetrachloroethylene boiled at 119.6°–120.6° C. at atmospheric pressure and had the specific gravity 1.617 at 20° C. with respect to water at 4° C. It was found to give a negative benzidine test.

Instead of aluminum chloride, other aluminum halides, e. g. aluminum bromide or aluminum iodide, may be employed in purifying or manufacturing tetrachloroethylene as hereinbefore described. However, such other aluminum halides are relatively expensive so that I prefer to employ aluminum chloride in the process.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of purifying tetrachloroethylene, the steps which consist in treating impure tetrachloroethylene with about 1 per cent its weight of aluminum chloride at above room temperature and thereafter distilling the mixture to separate purified tetrachloroethylene therefrom.

2. In a method of purifying tetrachloroethylene, the steps which consist in treating impure tetrachloroethylene with a relatively small portion of a material selected from the class consisting of aluminum and aluminum halides at a temperature at which hydrogen halide is evolved and thereafter distilling relatively pure tetrachloroethylene from the mixture.

3. In a method of purifying tetrachloroethylene, the steps which consist in heating a mixture of impure tetrachloroethylene and a material selected from the class consisting of aluminum and aluminum chloride to a temperature at which hydrogen chloride is evolved and thereafter distilling relatively pure tetrachloroethylene from the mixture.

4. In a method of purifying tetrachloroethylene, the steps which consist in heating impure tetrachloroethylene with a relatively small portion of aluminum chloride to a temperature at which hydrogen chloride is evolved, thereafter removing aluminum chloride from the treated mixture, and distilling the latter to separate relatively pure tetrachloroethylene therefrom.

5. In a method of purifying tetrachloroethylene, the steps which consist in heating impure tetrachloroethylene with aluminum chloride to a temperature at which hydrogen chloride is evolved and thereafter steam-distilling relatively pure tetrachloroethylene from the mixture.

6. In a method of purifying tetrachloroethylene, the steps which consist in heating impure tetrachloroethylene with a relatively small portion of aluminum chloride to a temperature at which hydrogen chloride is evolved and thereafter fractionally steam-distilling relatively pure tetrachloroethylene from the mixture.

GERALD H. COLEMAN.